United States Patent
Constantikes

(10) Patent No.: US 7,586,586 B2
(45) Date of Patent: Sep. 8, 2009

(54) FIBER OPTICALLY COUPLED, MULTIPLEXED, AND CHOPPED LASER RANGEFINDER

(75) Inventor: Kim Theodore Constantikes, Missoula, MT (US)

(73) Assignee: Associates Universities, Inc., Washington, DC (US)

( * ) Notice: Subject to any disclaimer, the term of this patent is extended or adjusted under 35 U.S.C. 154(b) by 102 days.

(21) Appl. No.: 12/017,825

(22) Filed: Jan. 22, 2008

(65) Prior Publication Data

US 2009/0046271 A1   Feb. 19, 2009

Related U.S. Application Data

(60) Provisional application No. 60/881,172, filed on Jan. 19, 2007.

(51) Int. Cl.
*G01C 3/08* (2006.01)
(52) U.S. Cl. .................. 356/5.15; 356/5.1; 356/5.01
(58) Field of Classification Search ........ 356/3.01–28.5
See application file for complete search history.

(56) References Cited

U.S. PATENT DOCUMENTS

| | | | |
|---|---|---|---|
| 4,689,489 A | 8/1987 | Cole | |
| 5,336,900 A | 8/1994 | Peters et al. | |
| 5,455,670 A | 10/1995 | Payne et al. | |
| 5,815,251 A | 9/1998 | Ehbets et al. | |
| 6,163,372 A | 12/2000 | Sallee et al. | |
| 6,205,267 B1 | 3/2001 | Aksyuk et al. | |
| 6,303,885 B1 | 10/2001 | Hichwa et al. | |
| 6,411,371 B1 | 6/2002 | Hingerling et al. | |
| 6,587,863 B1 | 7/2003 | Gentile et al. | |
| 2001/0030556 A1* | 10/2001 | Hartman et al. | 327/106 |
| 2002/0139927 A1 | 10/2002 | Check | |
| 2004/0150810 A1 | 8/2004 | Muenter et al. | |
| 2004/0201516 A1 | 10/2004 | Lyon | |
| 2005/0003785 A1* | 1/2005 | Jackson et al. | 455/260 |
| 2005/0057808 A1 | 3/2005 | Houde-Walter | |

FOREIGN PATENT DOCUMENTS

WO   WO 2005/001511 A1   1/2005

OTHER PUBLICATIONS

"Large-Scale Metrology—An Update", Estler, et. al., CIRP Annals—Manufacturing Technology 51(2), 2002.
*Electronic Distance Measurement*, J. M. Rueger, 3$^{rd}$. Ed., Springer-Verlag, New York, 1990.
"Sources of error in a laser rangefinder", K. S. Hashemi, et al., Rev. Sci. Instrum. 65(10) Oct. 1994.

* cited by examiner

*Primary Examiner*—Thomas H Tarcza
*Assistant Examiner*—Luke D Ratcliffe
(74) *Attorney, Agent, or Firm*—Novak Druce & Quigg, LLP

(57) ABSTRACT

A CW phase-delay distance measuring device is described. The device fiber-optically couples an amplitude modulated laser and a detector though MEMS fiber optic switches to provide chopping and multiplexing capability, and to allow measurement of transmit and receive coupling. Phase continuous direct digital synthesizers are used to generate transmit and local oscillator frequencies in an agile frequency diverse way to disambiguate range. Fiber-optic coupling mitigates systematic errors such as variable detector group delay and provides for multiplexing multiple transmit and receive optics onto a single electro-optical system.

20 Claims, 3 Drawing Sheets

FIBER OPTICALLY COUPLED, MULTIPLEXED, AND CHOPPED LASER RANGEFINDER

CLAIM OF PRIORITY

This application claims priority to U.S. Provisional Application No. 60/881,172 entitled "Fiber Optically Coupled, Multiplexed, and Chopped High Precision Laser Rangefinder" filed Jan. 19, 2007, the entirety of which is specifically incorporated by reference.

RIGHTS IN THE INVENTION

This invention was made with government support under Cooperative Agreement AST-0223851, between the National Science Foundation and Associated Universities, Inc., and, accordingly, the United States government has certain rights in this invention.

BACKGROUND

1. Field of the Invention

This invention is directed to electro-optical distance measuring apparatus and methods, and, in particular, amplitude modulated and heterodyne detected continuous wave (CW) laser phase delay distance measuring equipment.

2. Background of the Invention

Large-scale metrology includes the measurement of coordinates over large distances, for example, greater than the volume of a conventional coordinate measurement machine (CMM), which is typically limited to a cube of a few meters. There are many instances, for example in the aircraft industry, radio telescope and linear accelerator applications, where measuring such distances is preferably accomplished with a high degree of accuracy. There are also field measurements of smaller scale which do not lend themselves to placement in a CMM, such as in situ measurements of machinery, outdoor measurements, shop floor measurements, and other well known approaches.

The measurement of coordinates is typically accomplished by measuring a distance and two angles, as with a conventional surveying total station or laser tracking interferometer; the measurement of three orthogonal distances, as with a CMM; the measurement of angles from two locations on a known baseline, such as with theodolites; the measurement of spacing on a two-dimensional image projection from multiple locations, as with photogrammetry; the measurement of distance from three, or more, known locations on a baseline, as with multilateration; and various other manners. "Large-Scale Metrology—An Update", Estler, et. al., CIRP Annals—Manufacturing Technology 51(2), 2002, discusses various techniques for large scale metrology.

Laser rangefinders measure distance by measuring the time taken to propagate an optical wavefront from the emitter to target and back and inferring distance from a known or predicted propagation speed. One modality of time measurement is to modulate the amplitude of the CW emitted wavefront and measure the phase difference of the received wavefront modulation with respect to the transmitted one. Techniques of this type are described in Electronic Distance Measurement, J. M. Rueger, 3rd. Ed., Springer-Verlag, New York, 1990. "Sources of error in a laser rangefinder", K. S. Hashemi, et al., Rev. Sci. Instrum. 65(10) October 1994 discusses a laser rangefinder and the associated sources of error.

The National Radio Astronomy Observatory (NRAO) Robert C. Byrd Green Bank Telescope (GBT) is a 100 m diameter advanced single dish radio telescope designed for a wide range of astronomical projects with special emphasis on precision imaging. Open-loop adjustments of the active surface, and real-time corrections to pointing and focus on the basis of structural temperatures already allow observations at frequencies up to 50 GHz. Operation at higher frequencies requires more precise knowledge of optical element position and pose.

Limitations in the prior art, e.g., Payne, et al., do not permit the requisite length measurement accuracy. Limitations include variable phase delays in the detector due to beam spot position uncertainty, run-out of the steering mirror leading to systematic range errors, low rates of zero-point measurements (and equivalently, low chopping rates) leading to inclusion of low-offset frequency phase noise errors, and imprecise measurement of the coupling from transmitter to receiver electronics and optics leading to cyclic errors. The ambiguity in absolute range in single modulation CW rangefinders is also problematic, necessitating prior knowledge of range to less than one-half of the ambiguity range. In addition economies can be obtained if the control and electro-optics needed for measurement can be multiplexed amongst diverse baselines.

SUMMARY OF THE INVENTION

The present invention overcomes the limitations and disadvantages associated with current strategies and designs and provides an electro-optical distance measuring apparatus and methods.

One of the embodiments of the present invention is a laser rangefinder with diverse frequency and absolute range.

Another embodiment of the present invention is directed to an emitting device (e.g. laser diode) and a detecting device coupled with fiber optics.

Another embodiment of the present invention is directed to a method of coupling a multi-directional retroreflector including an emitting device and a detecting device with fiber optics.

Another embodiment of the present invention is directed to a method of coupling a multi-directional retroreflector including an emitting device and a detecting device with fiber optics, and using microelectromechanical system (MEMS) fiber optic switches to chop transmitted and received signals.

Another embodiment of the present invention is a laser rangefinder with fiber optically coupled optics.

Another embodiment of the present invention is a laser rangefinder with MEMS chopping, zero points, and transmit to receiver chopping at 100 Hz.

Another embodiment of the present invention is a laser rangefinder with a fiber-optic range reference loop.

Another embodiment of the present invention is a laser rangefinder able to multiplex multiple remote heads from one electro-optical (EO) package.

Another embodiment of the present invention comprises a laser rangefinder with small transmit and receive optics.

Another embodiment of the present invention is a laser rangefinder that eliminates phase uncertainty associated with photon centroid position on the detector.

Another embodiment of the present invention is a laser rangefinder with radio frequency interference (RFI) mitigation using optical cutoff tube and fiber.

Another embodiment of the present invention is a laser rangefinder with a visible laser diode.

Another embodiment of the present invention is a laser rangefinder with a visible laser diode that is thermo-electrically cooled to mitigate lasing wavelength changes.

Another embodiment of the present invention is a laser rangefinder that mitigates eye hazard.

Another embodiment of the present invention is a laser rangefinder with an easy-to-use alignment system.

Another embodiment of the present invention is a laser rangefinder convertible to near infrared (NIR) if desired.

Another embodiment of the present invention is a laser rangefinder with a diverged laser beam that mitigates pointing problems and small scale turbulence.

Another embodiment of the present invention is a laser rangefinder with fiber coupled optics optionally mounted on existing pointing heads with fiber wrap.

Another embodiment of the present invention is a laser rangefinder with a reduced cost and size by utilizing existing telecommunications and original equipment manufacturer (OEM) subsystems.

Another embodiment of the present invention is a laser rangefinder with instrument noise of less than the group index fluctuation/uncertainty.

Another embodiment of the present invention is a laser rangefinder with measured performance of 23µ on 20 m path at 10 Hz, 5 mrad beam, baseband of 130 MHz and 1 kHz local oscillator offset.

Another embodiment of the present invention is a laser rangefinder with instrument noise dominated by shot noise at the detector diode, at 1 kHz offset.

Another embodiment of the present invention is a laser rangefinder with measurement noise dominated by path group index of refraction fluctuations at 10 Hz.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

DESCRIPTION OF THE DRAWINGS

The invention is described in greater detail by way of example only and with reference to the attached drawings, in which.

DESCRIPTION OF THE INVENTION

Figure 1:
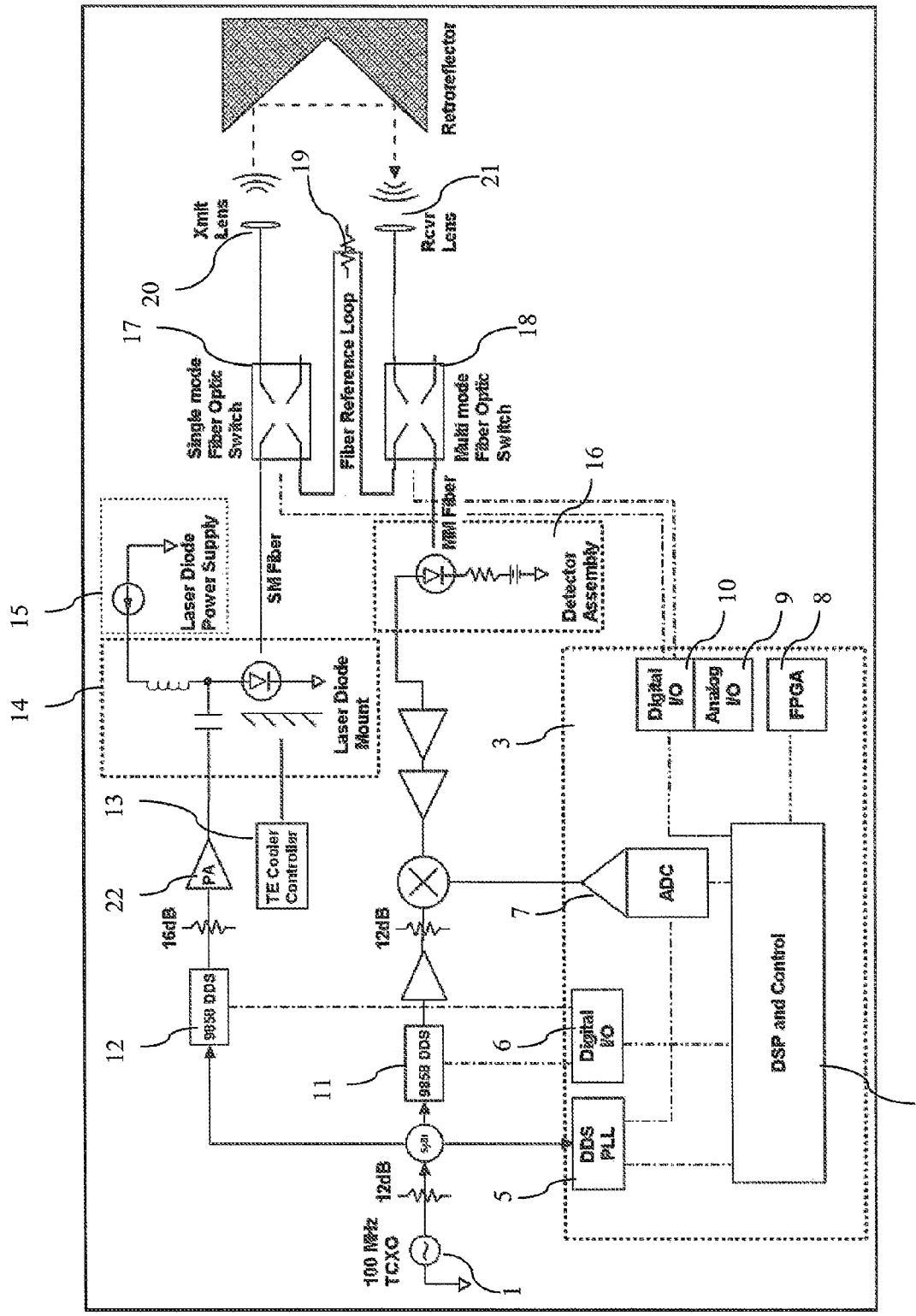
FIG. 1 is a schematic of one embodiment of the fiber-optically chopped laser rangefinder.

Large-scale metrology involves the measurement of coordinates over large distances. The measurement of coordinates over large distances is typically accomplished by measuring a distance and two angles, as with a conventional surveying total station or laser tracking interferometer. One type of metrology device transmits an intensity modulated signal, and then, using a heterodyne receiver, measures the difference in phase of the received AM signal with that of a local oscillator that has the same phase as the transmitted signal. Based on the index of refraction of the medium the path length from the transmitter to the receiver can be inferred. Measurements by conventional meteorological devices are limited by the ambiguity modulo $2\pi$ radians between the phase of the AM signal and the phase of the local oscillator.

It has been surprisingly discovered that by using the methods and systems of the present invention, the ambiguity between the phase of the AM signal and the phase of the local oscillator can be nearly eliminated.

In the present invention, the rangefinder optics may be mounted away from the instrument electro-optics without penalty (e.g. low losses in fibers). Direct Digital Synthesis phase continuous frequency diversity provides a method for disambiguating to absolute range. Using fiber-optically coupled optics, MEMS fiber-optical switches provide a mechanism for rapid chopping and multiplexing of optical signals and precise measurements of undesirable transmit to receiver coupling. In addition, multiple measurement heads can be easily multiplexed and radio frequency interference can be easily mitigated amongst other advantages. The present invention also accommodates both near infrared (NIR) and visible laser wavelengths. Visible laser wavelengths provide for greater power given eye-safety constraints and ease alignment, whereas NIR laser wavelengths provide enhanced optical propagation stability in the fiber-optics.

The laser rangefinder of the present invention can cover a broad frequency range. Preferably, the frequency range is from about 100 MHz to about 400 MHz due to technological limitations associated with the rangefinder electronics. More preferably, the frequency range is from about 1100 MHz to about 300 MHz. It will be clear to those skilled in the art that as the technology of laser diodes and the associated electronics improves, the range corresponding increases to well over 400 MHz. The method according to the present invention, of fiber optically coupled optics with a laser rangefinder has at least the advantages of rapid measurement of zero points, ability to measure transmit to receiver coupling at 100 Hz, a fiber optic reference loop, the ability to multiplex multiple remote heads from one EO package, eliminates the need to share a single optical aperture, no need for polarization decoupling of transmit and receiver optical signals, the transmission and recovery optics are small, no phase uncertainty associated with photon centroid position on the detector, and RFI mitigation (no "bare" detector or radiators; use of optical cutoff tube and fiber instead).

In one embodiment, a visible laser diode is included in the rangefinder. The visible laser offers mitigation of lasing wavelength changes, secondary group index error, and eye hazards, while easing alignment.

Referring now to FIG. 1, a fiber-optically chopped laser rangefinder according to one embodiment of the present invention is shown. A temperature controlled crystal oscillator (TCXO) 1 provides a reference signal for three direct digital synthesis (DDS) synthesizers. A first DDS 12 synthesizes the transmit frequency reference which is then amplified with power amplifier 22 and used to AM modulate a visible (e.g. red, green, blue, etc.) laser diode with a DC bias, comprising a laser diode mount 14 and a laser diode power supply 15, via a bias-T network. A thermoelectric cooler 13 is used to control the laser diode temperature. A second DDS 11 is used to synthesize a local oscillator frequency based on the reference signal, which is applied to the receiver mixer. A third DDS 5, located in the data acquisition and processor chassis 3, is used to synthesize the trigger signal for the analog-to-digital converter (ADC) 7 that digitizes the mixer output. Also contained within data acquisition and processor chassis 3 is a digital input/output device 6, a digital signal processing (DSP) and control unit 4, a field programmable gate array (FPGA) 8, an analog input/output 9, and a second digital input/output 10.

The laser beam is emitted from the laser diode mount 14, with power provided by laser diode power supply 15 and cooled by thermo-electric cooler controller 13. The beam then travels, via optical fiber, to fiber optic switch 17.

Figure 2:
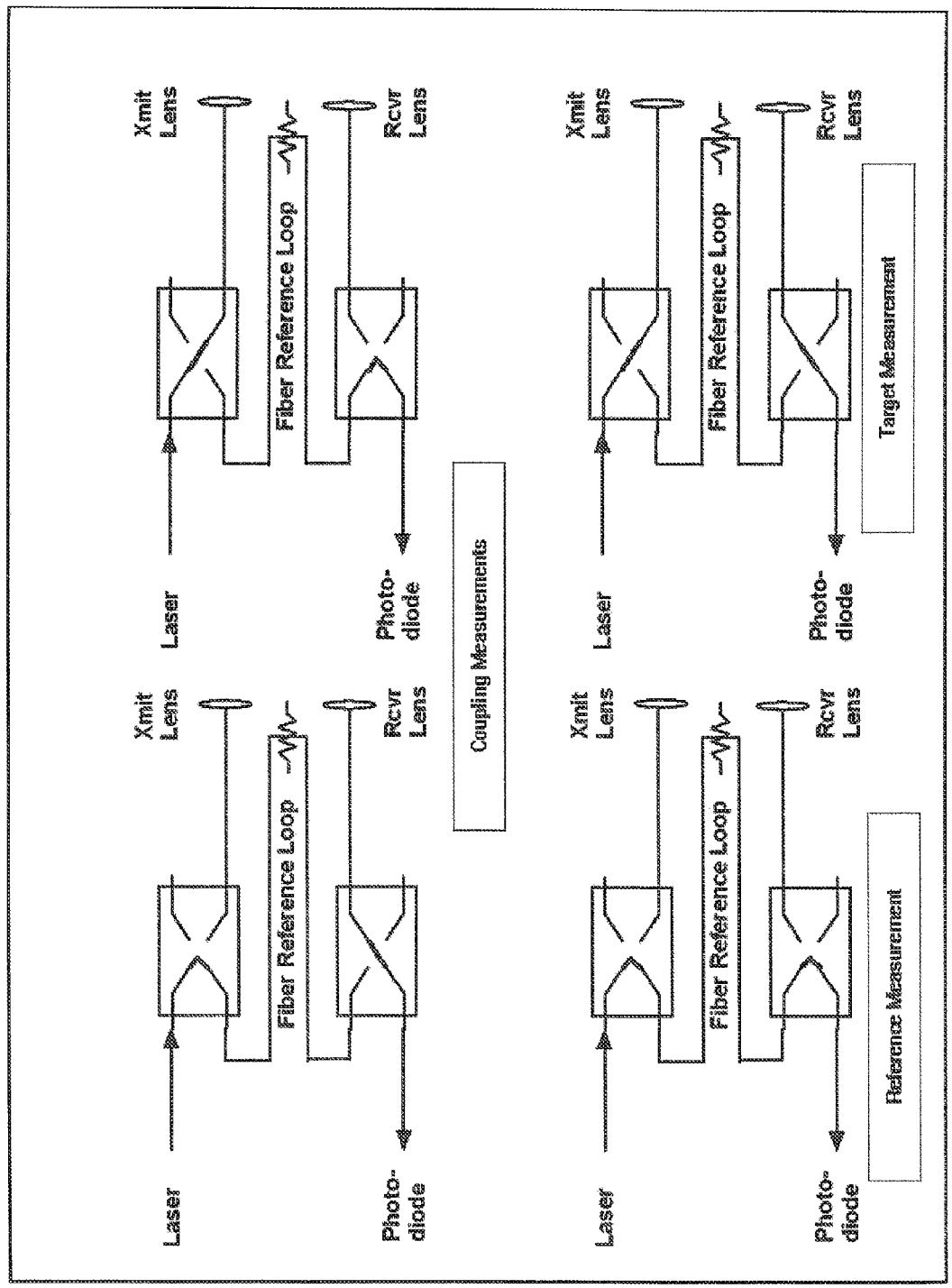
FIG. 2 is a schematic of fiber-optic switch configurations for measurements of coupling, reference range, and target range of one embodiment of the invention.

Ranging to a target, measurement of the reference loop, and electronic and optical coupling between the transmit and receive sections can be measured by commutating the optical paths in four ways as illustrated in FIG. 2, where the lines indicate the effective path of the optical signal within the switch. The target range is measured when the laser beam exits switch 17, is collimated by transmit lens 20, reflected back to the receive lens 21 which couples the received signal to the fiber, and then is coupled to the photo diode assembly 16 through optical switch 18. The reference range is measured when the switch 17 directs the beam through fiber reference loop 19, through fiber optic switch 18, then to the photo diode detector assembly 16. Coupling between transmit and receive sections of the electro-optics can be measured by either coupling the detector to the receiver lens and the transmitter to the reference loop or visa versa.

The optical output of the laser diode is switched, using a MEMS fiber optic device, between a range reference loop and a collimating lens used to launch the free-space wave. A companion MEMS device is used to commutate the receiver photodiode between the range reference loop and a collimator that couples the return from the retro-reflector into the receiver fiber. This topology allows for rapid chopping to mitigate the low offset frequency phase noise of the TCXO, determine thermal changes (in optical path length) of the transmit and receive fibers, and to measure the electronic cross talk between the receive and transmit sections by either transmitting to the reference loop. Nominally, the isolation of the MEMS devices is 70 to 80 dB.

When the photodiode output is amplified to overcome electronic cross talk in other parts of the instrument, the received signal is mixed with the LO, and then digitized in the chassis for further processing.

In addition, an array of eight temperature sensors, a barometric pressure sensor, a relative humidity sensor, and a three-axis translation stage are interfaced to the chassis.

Signal Processing

Analog-to-digital signal conversion is performed such that the converter is triggered at precise multiples of the common epoch of each, in order that the transmit and receiver DDS do not need to be precisely synchronized. To facilitate, the external DDSs have 32 bit tuning words with an 800 MHz clock and the internal DDS has a 24 bit tuning word with a 100 MHz clock, there are specific frequencies that accommodate this approach. In addition, spurs generated in the external DDSs can adversely affect performance, so the selection of frequencies is further limited to high SFDR regimes. For example, a local oscillator (LO) frequency of 203.125 MHz, a transmit offset of integral multiples of 1525.87890625 Hz, and an internal DDS frequency of 195312.5 Hz can be used. The clock for ADC is generated by a power-of-two division of the internal DDS (typically 8, or 24414.0625 Hz) and the convert trigger is generated also by power-of-two division (typically 512, or 381.4697265625 Hz). With these combinations the converter will start conversion at a fixed phase with respect to the transmit and receiver DDS signals, and the phase difference between the two will be constant regardless of the sample trigger for a fixed range phase delay.

Once the reference and range signals have been converted, the dot product of a signal with a sine and cosine signal produces I and Q estimates, and the phase estimate is the inverse tangent of I/Q. In some cases, detailed below, there is a FIR filter applied prior to phase estimation in order to attenuate interfering in-band signals, in which case only the segment of properly initialized data are used in the estimate.

The differential range is recovered by equating $2\pi$ radians around trip phase difference to one-half of the transmitter AM wavelength and compensating for the group index of refraction. Absolute range can be recovered from a single calibration that measures the difference in phase between a range signal at known distance with respect to a fiducial point and the reference loop phase. This is ambiguous with a period of one-half of the AM modulation wavelength, about 0.7 m. The ambiguity range can be extended by alternating the LO between multiple quasi-incommensurate frequencies in the obvious way. For example, one could select frequencies to disambiguate to about 400 meters. The recovery of absolute range or the two-frequency transmit process are optionally implemented, as the instrument architecture easily supports both. The external DDS can rapidly switch amongst four stored frequency profiles. The fiducial point for the transmit/receive optic can also be determined by measurements at two known ranges.

The following examples illustrate embodiments of the invention, but should not be viewed as limiting the scope of the invention.

EXAMPLES

In operations of the present invention, differential range between transmitter/receiver optics and a hollow retroreflector mounted on the three-axis translation stage were measured at approximately a 1 Hz rate. The nominal distance between them was 20 meters. The transmit beam and the receive beams were collimated with effective IFOV (Instantaneous Field of View) to the half-power diameter of approximately 1.0 and 2.5 milliradians, respectively. Path group index was calculated every two minutes using eight air temperature sensors, barometric pressure, and relative humidity. The local oscillator frequency for all experiments was 203.125 MHz, with transmit frequencies offset by integral multiples of 1525.87890625 Hz. In most cases 8192 samples of all four signal paths were taken, and at powers of two divisors of 48828.125 Hz.

Figure 3:
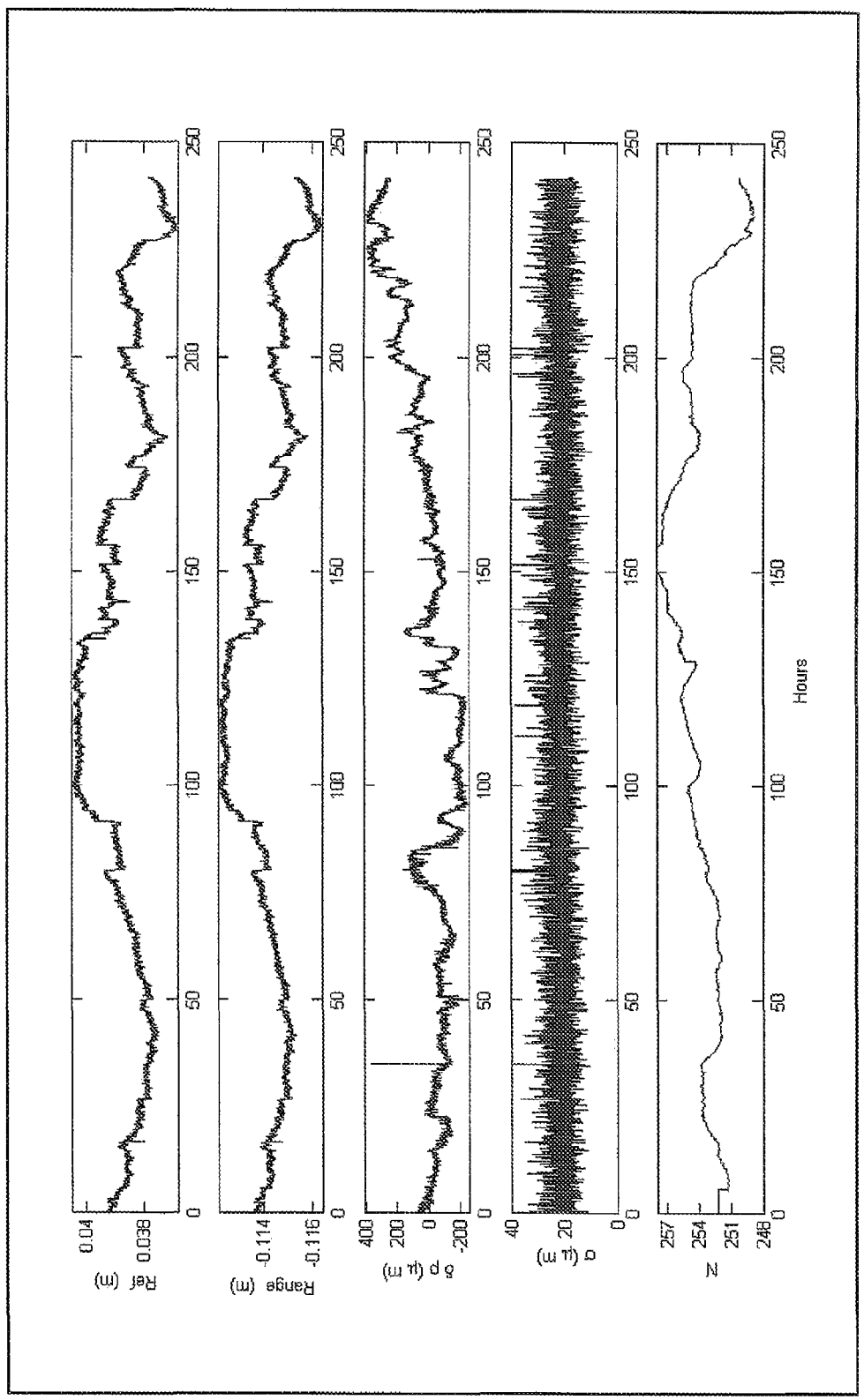
FIG. 3 illustrates the results of a long term test of one embodiment of the invention.

FIG. 3 illustrates the results of a long term (10 day) range stability test. The first two panels, showing the estimated distance-equivalent phase, clearly show the phase noise associated with the system, and the mitigation of this via chopping is shown in the next panel. The thirty-two sample range noise is shown in the next-to-last panel with a mean value of approximately 25 μm. The last panel shows the time series of refractivity predicted from path temperature, pressure, and humidity measurements.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A laser rangefinder comprising:
   a temperature-controlled crystal oscillator (TCXO) for providing a frequency reference signal;

a first direct digital synthesis (DDS) synthesizer, wherein the first DDS synthesizer receives the reference signal from the TCXO;

a power amplifier for amplifying the reference signal from the first DDS synthesizer;

a laser diode in communication with the power amplifier for outputting a optical signal, wherein the amplified reference signal AM modulates the laser diode output intensity;

a second DDS synthesizer for synthesizing a local oscillator frequency based on the reference signal;

a receiver mixer for mixing the local oscillator frequency from the second DDS synthesizer and a received signal;

an analog-to-digital converter (ADC) for converting the output from the receiver mixer to a digital signal;

a third DDS synthesizer for synthesizing the reference signals for the ADC; and a digital signal processing (DSP) and control unit for computing a range based on the phase difference between the digitized signal and the reference signal.

2. The laser rangefinder of claim 1, further comprising a laser emitting device and a optical detecting device coupled to fiber optics.

3. The laser rangefinder of claim 2, further comprising micro-electrical-mechanical system (MEMS) chopping of an emitted laser.

4. The laser rangefinder of claim 1, further comprising fiber optically coupled optics.

5. The laser rangefinder of claim 1, further comprising at least one input/output device.

6. The laser rangefinder of claim 1, further comprising a digital signal processing and control unit.

7. The laser rangefinder of claim 1, further comprising a field programmable gate array.

8. The laser rangefinder of claim 1, further comprising a fiber reference loop.

9. The laser rangefinder of claim 1, further comprising diverging optics.

10. The laser rangefinder of claim 1, further comprising a visible laser diode.

11. The laser rangefinder of claim 10, wherein the visible laser diode is thermo-electrically cooled.

12. The laser rangefinder of claim 1, wherein the frequency range of the laser is between 100 MHz and 300 MHz.

13. The laser rangefinder of claim 1, wherein the frequency of the laser is over 100 MHz.

14. A method of measuring a distance using a laser rangefinder comprising the steps of:

generating a reference signal from a temperature-controlled crystal oscillator (TCXO) for three direct digital synthesis (DDS) synthesizers;

generating a modulated optical signal at a given modulation frequency based on the reference signal, wherein the modulated optical signal is synthesized by a first DDS synthesizer;

transmitting the modulated optical signal from a reference location to at least one target, reflecting the optical signal off of the at least one target;

receiving the reflected signal;

mixing the received signal with a local oscillator frequency synthesized by a second DDS synthesizer;

converting the received signal to a digitized signal; and measuring the distance based on the phase difference between the digitized signal and the reference signal, wherein the reference signal is synthesized by a third DDS synthesizer.

15. The method of claim 14, wherein the step of generating a modulated optical signal is comprised of emitting a laser beam from a fiber optic switch.

16. The method of claim 15, wherein the step of reflecting the optical signal is comprised of reflecting a laser beam off a reflective surface and back through a fiber optic switch.

17. The method of claim 15, wherein the step of reflecting the optical signal is comprised of reflecting a laser beam through a fiber reference loop and a multi-mode fiber optic switch.

18. The method of claim 14, wherein the step of receiving the reflected signal is comprised of:

receiving a reflected laser beam at a receiver lens;

transmitting the laser beam back through the fiber optic switch; and receiving the reflected laser beam at a photo diode detector assembly.

19. The method of claim 14, wherein the step of transmitting the optical signal is comprised of passing a laser beam through a transmit lens.

20. The method of claim 14, wherein the step of receiving the reflected signal is comprised of:

passing a laser beam through a fiber reference loop and a fiber optic switch; and receiving the switched laser beam at a photo diode detector assembly.

* * * * *